US006603536B1

(12) United States Patent
Hasson et al.

(10) Patent No.: US 6,603,536 B1
(45) Date of Patent: Aug. 5, 2003

(54) HYBRID OPTICAL CORRELATOR/DIGITAL PROCESSOR FOR TARGET DETECTION AND DISCRIMINATION

(75) Inventors: Victor Hasson, Winchester, MA (US); Gerald A. Nordstrom, Truxton, NY (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 10/105,081

(22) Filed: Mar. 22, 2002

Related U.S. Application Data

(60) Provisional application No. 60/351,556, filed on Jan. 24, 2002.

(51) Int. Cl.[7] .............................. G01P 3/36; G01C 3/08; G01R 19/00; G01R 23/17
(52) U.S. Cl. .................... 356/28.5; 356/5.09; 356/5.15; 324/76.33; 324/76.37
(58) Field of Search ..................... 324/76.37, 76.33; 356/5.09, 5.15, 28.5

(56) References Cited

U.S. PATENT DOCUMENTS 3,055,258 A * 9/1962 Hurvitz
3,765,768 A * 10/1973 Budin et al.
4,722,596 A * 2/1988 Labrum

* cited by examiner

Primary Examiner—Stephen C. Buczinski
(74) Attorney, Agent, or Firm—Weingarten, Schurgin, Gagnebin & Lebovici LLP

(57) ABSTRACT

An optical correlator is used to detect the presence of a target in a laser detection and ranging (LADAR) system by analyzing the return signal, and to provide initial estimates of the targets range and velocity to the LADAR receiver. The optical correlator includes an acoustic optical Bragg cell that deflects an input laser signal using the received and down-converted LADAR signal. An integrating optical detector is disposed to receive the optical outputs of the acoustic optical Bragg cell and an optical processor analyzes and processes the integrating optical detector data. The integrating optical detector integrates the optical outputs of the Bragg cell over time and the integrating optical detector output is sampled over a sampling period so that target detection is uncorrelated to noise. An integrating optical detector data point that exceeds a predetermined threshold is considered to be a valid detected target and the location of the output of the optical correlator on the integrating optical detector is indicative of the Doppler shift and hence the velocity of the detected target. The time of detection of the target is indicative of the range to the target. This allows the range-Doppler-amplitude of the target to be estimated and provided to the receiver to allow for more accurate processing of the receiver data. In addition, the optical correlator can be used to provide whole body Doppler and range estimates of the target and can also inherently averages the speckle data.

34 Claims, 3 Drawing Sheets

HYBRID OPTICAL CORRELATOR/DIGITAL PROCESSOR FOR TARGET DETECTION AND DISCRIMINATION

CROSS REFERENCE TO RELATED APPLICATIONS

This application claims priority under 35 U.S.C. §119(e) to U.S. Provisional Patent Application Ser. No. 60/351,556, filed Jan. 24, 2002.

STATEMENT REGARDING FEDERALLY SPONSORED RESEARCH OR DEVELOPMENT

N/A

BACKGROUND OF THE INVENTION

Coherent long-range laser radar (LADAR) systems rely on externally supplied data to cue the RF receiver processor to examine received data at a known time and frequency. Such externally supplied data can include target angle sensor data, target range, target range rate, and target velocity. This reliance on externally supplied target data reduces the utility of this type of long range LADAR as a stand-alone autonomous system. The externally supplied data is needed in these types of systems to limit the volume of space to be searched for long-range fast-moving targets to keep the amount of data to be stored and processed to a manageable level.

In addition, LADAR systems having an all range capability would require multiple pulses to overcome speckle using pulse tone acquisition waveforms. Speckle occurs due to the surface roughness of the target having a greater dimension than the wavelength of the laser radar used to detect the target. This leads to interference in which a speckle null may occur and a target missed or lost until the target orientation relative to the the LADAR receiver has changed sufficiently to shift the interference from the null. Speckle is typically overcome by the use of multiple pulses of laser radar energy to ensure that the probability of detection of a target is nearly 100%.

Range to a target can be found by removing the Doppler shift of the return pulse and correlating the return pulse with the transmitted pulse to determine the phase shift of the return pulse. This allows the time the pulse took to travel to and from the target to be accurately determined and therefore the range of the target may be accurately estimated. This process requires the identification and removal of the Doppler shift from the return pulse.

Typically to remove the Doppler shift from a signal, the spectrum of the signal is electrically analyzed. One method of analyzing the spectrum of a signal is to measure the energy of the signal of interest in each of a plurality of narrow frequency bands. The sensitivity and accuracy of this method is dependent upon the number and the width of the selected frequency bands of a corresponding plurality of band-pass filters. This process typically uses a superheterodyne receiver and is referred to as a swept spectrum analysis. However, swept spectrum analysis does not monitor or measure all frequencies at all times. As the sensitivity of the spectrum analyzer is increases by increasing the number of bandpass filters and reducing the bandwidth of each of the filters, the time required to sweep through all of the resulting frequency bands is increased. Accordingly, the probability of intercepting a given signal is less than 100%. In an environment in which frequency-hopping systems are used, some signals are likely to be missed at least some of the time.

Another method of spectrum analysis also uses narrow bandpass filters, but in this method, a non-linear device is coupled to the output of the corresponding bandpass filter. The non-linear device provides an output that is dependent on the energy contained within the passband of the corresponding filter channel. The outputs of each of the non-linear devices are integrated over a time interval consistent with the passband width of the bandpass filter, and the outputs are multiplexed and sampled at rate to ensure a probability of intercept near 100%. However, since the frequencies of interest are typically in the radio frequency (RF) region the component values for each of the required bandpass filters can be awkward. In addition to ensure that there is no corruption of the filtered signals, each bandpass filter must have sufficient stop-band attenuation to prevent crosstalk signal interference from adjacent bands. Accordingly, the bandpass filters must be of a sufficiently high order to provide the necessary stop-band attenuation to suppress these adjacent signals. The number of components may also increase with the order of the filters so that these filters increase in size and the rate of power consumption increases with the order of the filters.

The above prior art methods are primarily analog in nature, so that the output of the various systems is nearly instantaneous. However in some applications, analog systems are inherently less accurate than digital systems although analog systems can provide a speed advantage over digital systems. Digital systems have been employed in these systems requiring high accuracy in order to provide the required highly accurate data. In particular, Fast Fourier transforms (FFTs) can be used to determine the spectral energy within one or more channels of interest. However, searching a three-dimensional volume of space for targets and attempting to detect and estimate the range and Doppler shift of a target requires the storage and processing in real-time of an extremely large amount of data.

Therefore, what is needed is a system that allows for the detection, estimation of the range, and estimation of the Doppler shift of a target that is simple and does not require complex analog filters or the storage and real-time processing of large amounts of data.

BRIEF SUMMARY OF THE INVENTION

An optical correlator is used to detect and discriminate the presence of a target in a laser detection and ranging (LADAR) system by analyzing the return signal, and to provide initial estimates of the targets range and velocity to the LADAR receiver. The optical correlator includes an acoustic optical Bragg cell that diffracts/deflects an input laser beams using the received and down-converted LADAR signal. A set of integrating photodetectors is disposed to receive the diffracted/deflected laser beam output of the acoustic optical Bragg cell. The set of integrating photodetectors integrates the diffracted/deflected laser beam output of the Bragg cell over time and the integrated output is sampled at a predetermined sampling period to uncorrelate the target from noise. An optical processor analyzes and processes the data output from the set of integrating photodetectors. If one of the integrated outputs exceeds a predetermined threshold, a valid target has been detected. The physical location of the particular integrating photodetector that has received the diffracted/deflected laser beam output of the Bragg cell is indicative of the Doppler shift and hence the velocity of the detected target. The time of detection of the target is indicative of the range to the target. This allows the range-Doppler-amplitude of the target to be estimated and provided to the receiver to allow for more accurate processing of the receiver data. In addition, the optical correlator can be used to provide whole body Doppler and range estimates of the target and can also inherently average the speckle data.

In one embodiment, a hybrid processor for detecting a target at an intermediate frequency (IF) signal includes a correlator RF drive module that receives the IF signal and is configured and arranged to up-convert the IF signal into a correlator drive signal. The correlator drive signal has a correlator frequency and further is a band limited signal. The correlator drive signal is coupled to an optical spectrum analyzer/correlator.

The optical spectrum analyzer/correlator includes a laser source providing a laser beam, an acousto-optical Bragg cell having an input receiving, the correlator drive signal, and collimating optics disposed between the laser source and the acousto optical Bragg cell. The collimating optics are configured and arranged to collimate the laser beam and to provide the collimated laser beam to be incident on the acousto-optical Bragg cell. The acousto-optical Bragg cell is responsive to the correlator drive signal by diffracting/ deflecting the incident collimated laser beam, and wherein the acousto-optical Bragg cell to provides a plurality of diffracted/deflected output laser beams and an undiffracted/ undeflected output laser beam. An optical system is configured and arranged to receive the diffracted/deflected laser beam and to perform a Fourier transform on the diffracted/ deflected laser beam and to image the plurality of the diffracted Fourier transformed laser beams onto an image plane. An optical integrating photodetector array that includes a plurality of integrating photodetectors that are disposed within the image plane provide a plurality of output signals, each signal corresponding to one of the plurality of integrating photodetectors. An optical processor is coupled to the optical photodetector array and receives the plurality of output signals therefrom, and is operative to process the plurality of output signals to detect a target and to provide an output cueing signal indicative of a detected target. In addition, the optical processor can analyze the received data to estimate the Doppler shift of the target and the range of the target.

Other forms, features and aspects of the above-described methods and system are described in the detailed description that follows.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

The disclosure of U.S. Provisional Patent Application No. 60/351,556 is hereby incorporated by reference.

Figure 1:
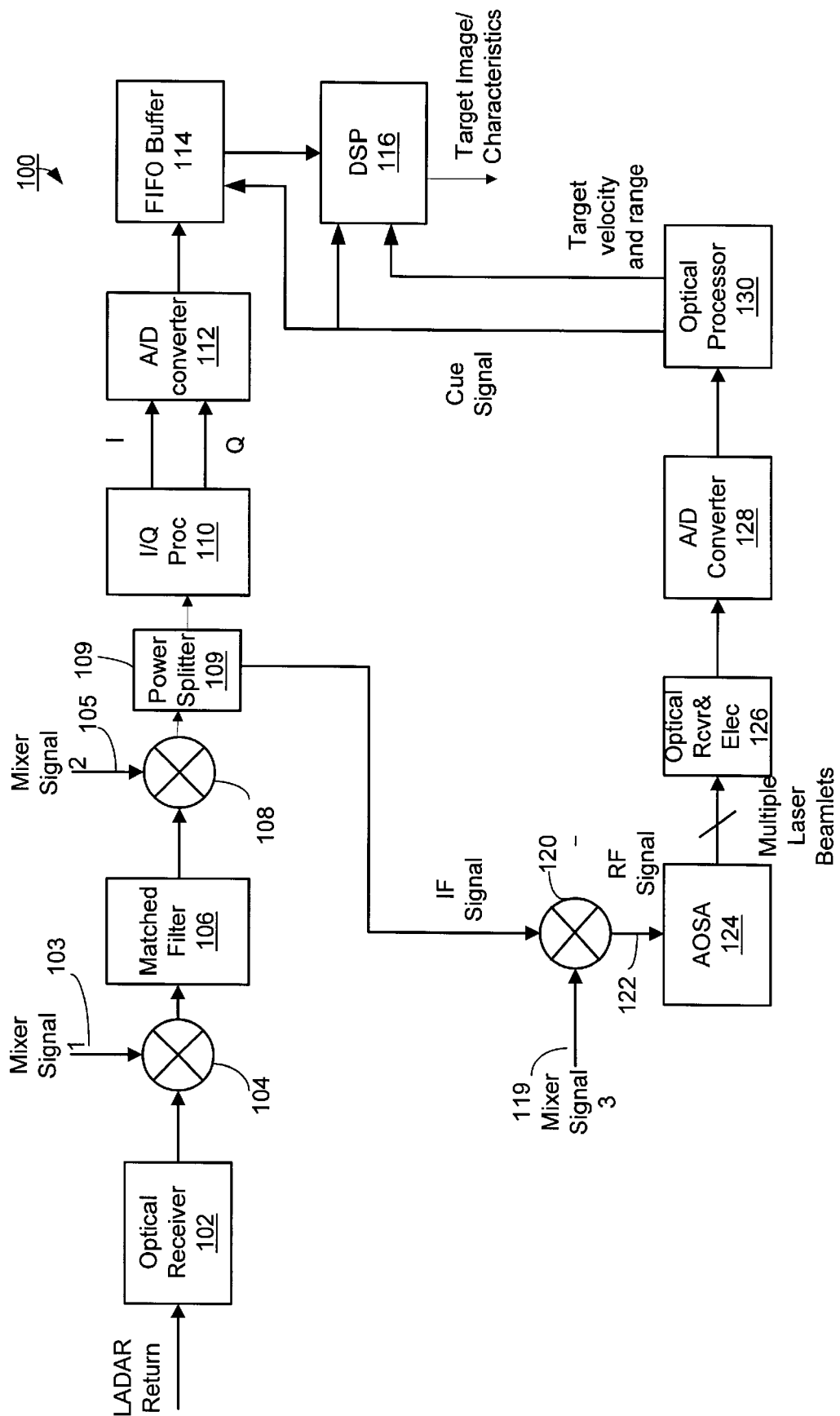
FIG. 1 is a block diagram of one embodiment of a hybrid optical spectrum analyzer/correlator for an all range coherent laser radar.

FIG. 1 depicts a block diagram of an embodiment of a hybrid processor 100 using an analog optical spectrum analyzer/correlator and digital processing. The hybrid processor 100 receives a laser radar ("LADAR") optical return signal and the optical receiver 102 detects the LADAR optical return signal and provides the detected optical signal to a mixer 104. The mixer 104 also receives a first mixer signal 103 and up-converts the detected optical return signal to an up-converted signal having a first frequency. In the embodiment depicted in FIG. 1, the first frequency is 7.5 GHz. The up-converted signal is filtered using a matched filter 106 having a bandwidth that is a first order matched filter based upon the whole body Doppler shift of the target, the pulse shape and the pulse width. The pulse shape and pulse width are dependent upon the transmitter characteristics and the estimate of the whole body Doppler shift of the target. As will be explained in more detail below, the whole body Doppler shift is estimated and provided by hybrid processor described herein.

After being estimated by the hybrid processor the matched filter 106 is adjusted appropriately to remove the whole body Doppler shift, leaving only the target rotational Doppler information. The filtered up-converted signal is mixed in mixer 108 with a second mixer signal 105 to down-convert the up-converted signal to a baseband signal having a second frequency. In the embodiment illustrated in FIG. 1 the second frequency is 500 MHz. The base band signal is split at power splitter 109 with a first output resolved into in-phase and quadrature-components ("I&Q components") by I&Q module 110. This down-conversion and resolution into I&Q components cuts the digital sampling rate that is required in half, resolves frequency foldover and removes the imaginary value image. The range of the target determines the sampling rate that is needed. In one embodiment, the sampling rate is 1 Gigasample/sec. As will be discussed in more detail below, the estimate of the target range is provided by the optical spectrum analyzer/correlator described herein. The I&Q components are sampled, and digitized by analog-to-digital converter 112 and stored in FIFO buffer 114. DSP 116 is coupled to FIFO buffer 114 can control the FIFO buffer 114 and retrieve data therefrom as well. As will be explained below, the DSP 116 is also coupled to the optical processor 130 and receives from the optical processor 130 a cue signal indicating the presence of a target, the estimate of the target range, and the target Doppler shift. The DSP 116 is responsive to the cue signal by retrieving and analyzing the data stored in the FIFO buffer 114 to determine preselected target characteristics, such as the target velocity, range, range rate, and rotational velocity.

As discussed above, the baseband signal provided by mixer 108 is split by a power splitter 109 and the second output of the power splitter 109 is mixed with a third mixer signal 119 in mixer 120. Mixer 120 and the third mixer signal 119 are used to center the output signal of mixer 120 at a third frequency that is at or near the center of the operating frequency range of the acousto-optical Bragg cell (206 in FIG. 2). The output signal from the mixer 120 is the correlator drive signal 122 that is provided to the acousto-optical spectrum analyzer ("AOSA") 124. The AOSA 124 provides a plurality of laser beamlets to an optical receiver-&-electronics module 126.

Figure 2:
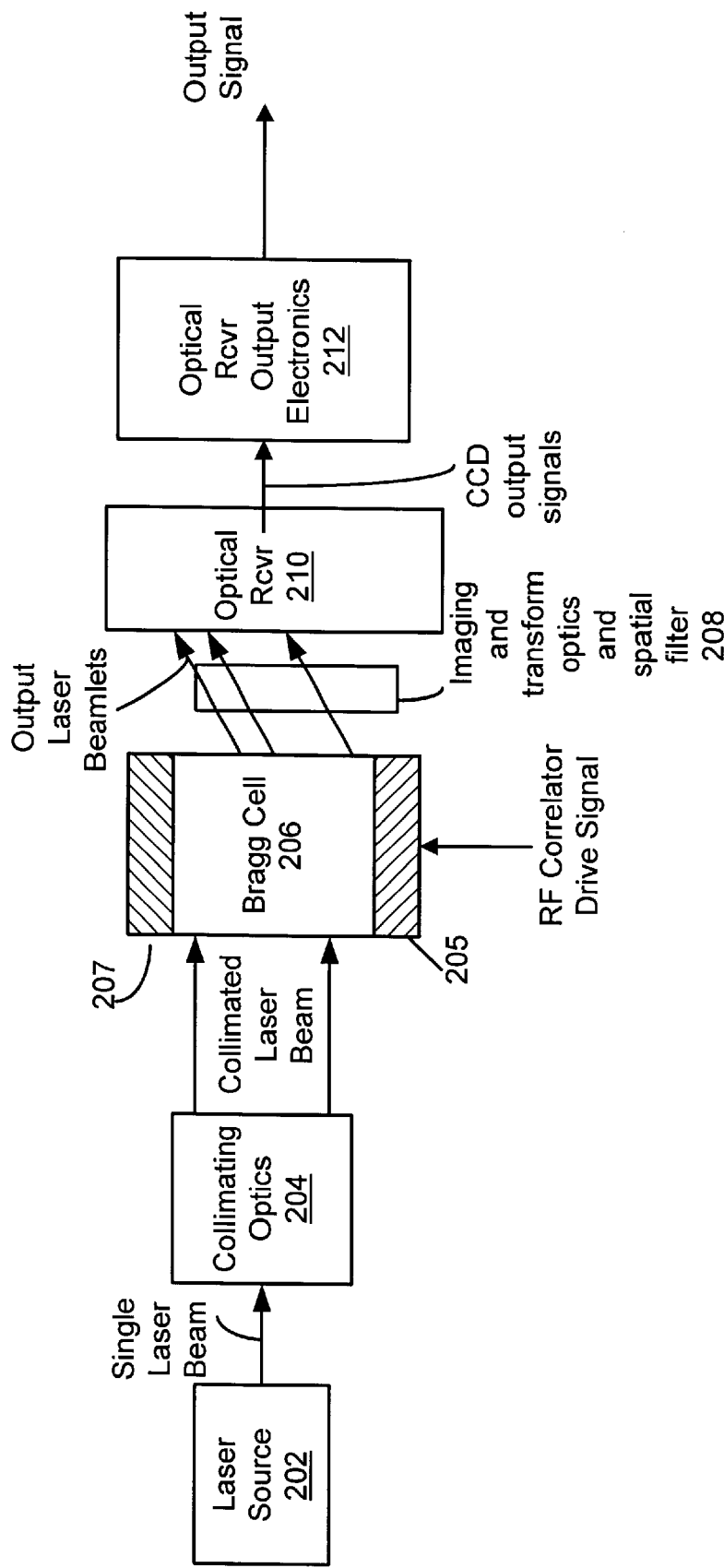
FIG. 2 is a more detailed block diagram of the acousto-optical spectrum analyzer depicted in FIG. 1.

Referring now to FIG. 2 in which a more detailed block diagram of the AOSA 124 and the optical receiver & electronics module 126 is provided. The AOSA 124 includes a laser source 202 that provides a laser beam that is collimated by collimating optics 204, wherein the collimated laser beam provided by the collimating optics 204 is incident on a acousto-optical Bragg cell ("Bragg cell") 206. The Bragg cell 206 includes an electro-optical transducer 205 that is coupled to the correlator drive signal 122, wherein the incident laser beam is diffracted/deflected in response to the correlator drive signal 122. The correlator drive signal forms an acoustic wave within the Bragg cell 206 having a radio frequency carrier, i.e. the third frequency in which the amplitude affects the index of refraction of the Bragg cell 206. The Bragg cell 206 also includes an acoustical absorber 207 on the opposite side of the Bragg cell 206 from the electro-optical transducer 205 to absorb the correlator drive signal 122 to avoid unwanted internal reflections of the drive signal 122 within the Bragg cell 206. The Bragg cell 206 diffracts/deflects the incident collimated laser using the modulated acoustic wave, i.e. the correlator drive signal 122. Accordingly, the modulated acoustic wave determines the space modulation of the collimated laser energy incident on the Bragg cell 206. The space modulated output of the Bragg cell 206 is a plurality of laser beamlets that provide instantaneous spectral information on the correlator drive signal 122.

The output of the Bragg cell 206, i.e., the plurality of output laser beamlets, is imaged, Fourier transformed, and spatially filtered by Fourier imaging and spatial filter optics 208. The Fourier imaging optics 208 perform a Fourier transform on the plurality of laser beamlets and image the plurality of laser beamlets into an imaging plane where a an optical receiver 210 that includes a plurality of integrating optical photodetectors is disposed. The spatial filtering is necessary to remove the undiffracted/undeflected laser energy that is present on the output of the Bragg cell 206.

In the embodiment depicted in FIG. 1, the plurality of integrating optical detectors is a linear array of integrating optical detector photodetectors. Other detectors can be used for example, avalanche photodiodes, p-i-n diodes, charge coupled devices (CCDs), and multi-channel photodetector arrays (i.e., channeltrons) are all suitable integrating optical photodetectors. The Fourier transformed laser output of the Bragg cell forms a line spectrum that is imaged by the imaging optics onto an image plane. The linear array of photodetectors is disposed in the image plane so that the line spectrum is incident on the linear array of photodetectors. The position of the largest output spectral line with respect to the center frequency of the AOSA 124 yields an estimate of the whole body Doppler shift. As will be explained in more detail below, the line spacing is dependent on the system geometry and specifications. The outputs from the linear array of photodetectors is scanned by the optical detector output electronics 212 and provided thereby as a plurality of integrating optical photodetector output signals. Each of the plurality of plurality of integrated optical detector output signals corresponds to one of the plurality of photodetectors. In general, the frequency resolution of the photodetector array is given by the Bandwidth of the Bragg cell divided by the number of photodetectors in the linear array and consistent with the usual time-bandwidth limitations of the Bragg cell.

Referring again to FIG. 1, the plurality of integrating optical detector output signals is provided to an analog-to-digital converter 128 that samples the plurality of the integrating optical detector output signals at a predetermined sample rate. The analog-to-digital converter 128 provides a digital representation of the samples of the integrating optical photodetector output signals. In the embodiment illustrated in FIG. 1, the predetermined sample rate is 80 Megasamples-per-second and the digital representation of each sample is 14 bits long. The digitized samples are provided to the optical processor 130 for analysis.

Figure 3:
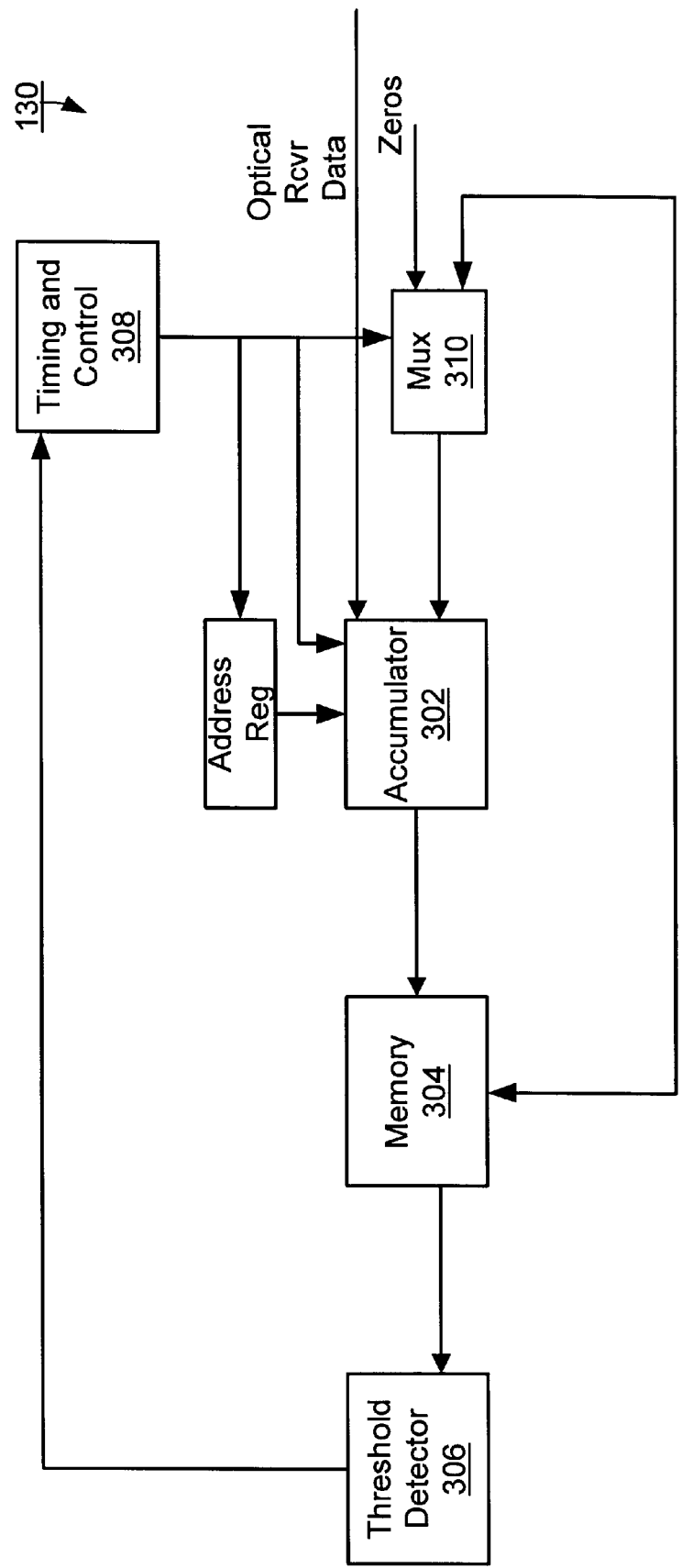
FIG. 3 is a more detailed block diagram of an optical processor depicted in FIG. 1.

FIG. 3 depicts one embodiment of an optical processor 130 suitable for use with the optical spectrum analyzer/correlator described herein. The optical processor 130 receives the digitized samples in an accumulator 302 that accumulates the respective received digitized samples over one or more complete scans of the integrating optical photodetectors. This allows the integration of the integrating optical detector data over a predetermined period of time. When the digitized data has been accumulated for the predetermined period, the data is stored in a memory 304 and the digitized stored values are compared in a threshold detector 306 to a predetermined threshold value. If a stored value exceeds the predetermined threshold value, a signal is sent to the timing and control module 308 that is responsive to the signal received from the threshold detector 306 by providing a cue signal output. In addition to the cueing signal, the timing and control module 308 also provides the address control to the address register 310 and also provides the necessary control for the analog-to-digital converters 112 and 128 and the internal control signals. The mux 310 also receives a zero signal so that the accumulator 302 and the memory 304 can be zeroed and initialized.

The optical processor 130, in addition to providing the cue signal to the DSP 116 indicating that a target is present due to the exceeded threshold value, can also confirm the presence of a target through a correlation process. The correlation process that is used to to confirm the presence of a target also increases the signal to noise ratio and concomitantly reduce the false alarm rate. The optical processor correlates the integrating optical detector data stored in the memory 304 in a modulo N manner. That is, the optical processor correlates every N data points, where the modulo parameter N is equal to the number of photodetectors in the linear array divided by the number of output beam spots of the Bragg cell. In one embodiment in which there are 2000 photodetectors in the linear integrating optical detector array and there are 80 beam spots output of the Bragg cell, the correlation would occur in a modulo 25 manner. Advantageously, the modulo N correlation obviates the speckle interference in the return signal by averaging the speckle over the broad spectrum return signal. The optical processor 130 further analyzes the optical data to estimate the Doppler shift of the target and the target range. The optical processor 130 analyzes the digitized integrating optical detector data retrieved from the memory 306 to determine the position of the largest output spectral line with respect to the center frequency of the Bragg cell. As discussed above this provides an estimate of the Doppler shift of the target. In addition, the range can be estimated by determining the difference in time between the transmission of the transmitted pulse and the detection of the target.

After the DSP 116 receives the cue signal indicating a valid target, the DSP 116 stops the storage of data in the FIFO buffer 114. The DSP 116 retrieves the data stored in the FIFO buffer 114 for analysis to determine one or more preselected target characteristics. In one embodiment, the IF signal is used to provide a second RF signal that is stored in memory separately. A cue signal received by the DSP 116 will cause the DSP 116 to retrieve the stored second RF signal data and to determine one or more characteristics in of the object using this data.

In one embodiment a hybrid processor includes a Bragg cell having a center frequency of 3 GHz, a bandwidth of 2 GHz, a dynamic range of 30 dB (linear) and 60 dB (compression), a sensitivity of −53 dBm (cw) and −20 dBm (pulsed), and provides an output of 80 laser beamlets. The photodetector array is a Loral Fairchild CCD 181 M line scan module that includes 2592 photodetector elements and has an effective readout rate of 1 MHz (typical) and 10 MHz (maximum). If a faster photodetector array is desired a Channeltron array may be used. The laser source for the AOSA is a GaAlAs laser having a wavelength of 690 nm. An integration time of 1 microsecond (typical) and 275 microsecond (maximum) is used. A LADAR source providing burst pulses lasting 6 microseconds wherein each burst pulse includes 256 1 ns micropulses spaced 40 ns apart.

In this embodiment, the frequency resolution of the system is approximately 2 GHz per 2000 photodetectors, or approximately 1 MHz per photodetector. The spacing of the micropulses, 40 ns, leads to an output of a comb spectrum of 40 teeth separated by 25 MHz. Thus, the Doppler shift of a target may be estimated to within 12.5 MHz.

The hybrid processor provides an increase in signal to noise ratio due to the processing of the received data. In general, the thermal noise for a, system is given by KTB, where K is Boltzman's constant $1.3*10^{\wedge}(-23)$, T is the system noise temperature in Kelvins 300, and B is a bandwidth of a matched filter, 250 KHz in the current embodiment. This leads to a system thermal noise −120 dBm. Shot noise is typically 3 dB above thermal noise, so that shot noise is −117 dBm. A signal-to-noise ratio of 15 dB should provide for good detection thus the minimum detectable signal is −102 dBm.

Those of ordinary skill in the art should further appreciate that variations to and modification of the above-described methods, apparatus and system for a hybrid optical spectrum analyzer/correlator for an all range laser radar may be made without departing from the inventive concepts disclosed herein. Accordingly, the invention should be viewed as limited solely by the scope and spirit of the appended claims.

What is claimed is:

1. A hybrid processor for detecting a target in an intermediate frequency (IF) signal, the hybrid processor comprising:
    a correlator RF drive module receiving the IF signal, the correlator RF drive module configured and arranged to up-convert the IF signal into a correlator drive signal having a correlator frequency and to bandlimit the correlator drive signal;
    an optical spectrum analyzer/correlator including
        a laser source providing a laser beam;
        an acousto-optical Bragg cell having a modulator input coupled to the correlator RF drive module and receiving the correlator drive signal therefrom;
        collimating optics disposed between the laser source and the acousto optical Bragg cell the collimating optics configured and arranged to collimate the laser beam and to provide a collimated laser beam, the acousto-optical Bragg cell disposed to receive the collimated laser beam;
        the acousto-optical Bragg cell responsive to the correlator drive signal by diffracting the collimated laser beam, the acousto-optical Bragg cell providing a plurality of diffracted output light beams and an undiffracted output light beam;
        an optical system configured and arranged to receive the plurality of diffracted light beams and to Fourier transform the plurality of diffracted light beams and further configured and arranged to image the plurality of the diffracted light beams onto an image plane;
        an integrating optical detector array including a plurality of photodetectors, the optical photodetector array disposed within the image plane and providing a plurality of output signals each corresponding to the output of one of the plurality of photodetectors;
    an optical processor coupled to the integrating optical detector array and receiving the plurality of output signals therefrom, the optical processor operative to process the plurality of output signals to detect a target, wherein the optical processor provides a cue signal upon the detection of a target.

2. The hybrid processor of claim 1 wherein the optical processor in processing the received plurality of output signals is operative to compare each of the plurality of output signals to a predetermined threshold, wherein a target is detected when one of the output signals exceeds the predetermined threshold.

3. The hybrid processor of claim 1 wherein the optical processor is further operative to correlate the plurality of output samples modulo the number of the plurality of photodetectors divided by the number of the plurality of diffracted light beams.

4. The hybrid processor of claim 1 wherein the optical processor is further operative to estimate the Doppler shift of the target as a function of the position of the photodetector corresponding to the detected output signal within the plurality of photodetectors.

5. The hybrid processor of claim 1 wherein the optical processor further receives an indicia of the transmission of a pulse, and estimates the target range as a function of the time delay between the transmission to the target detection.

6. The hybrid processor of claim 1 wherein the optical processor includes:
    a timing and control module operative to provide a plurality of control signals;
    an accumulator coupled to the the integrating optical detector array and receiving the plurality of output signals therefrom, the accumulator configured and arranged to accumulate the plurality of output signals over a predetermined period of time;
    a optical processor memory coupled to the accumulator and configured and arranged to store the plurality of accumulated values wherein each of the plurality of accumulated values corresponds to a respective photodetector;
    a threshold detector coupled to the optical processor memory, the threshold detector configured and arranged to compare each of the plurality of accumulated values to a predetermined threshold, wherein in the event that one of the plurality of accumulated values exceeds the predetermined threshold a threshold signal is provided to the timing and control module;
    the timing and control module responsive to the threshold signal by providing a cue signal output.

7. The hybrid processor of claim 6 wherein the timing and control module is further responsive to threshold signal by estimating the Doppler shift of the detected target as a function of the position of the photodetector corresponding to the detected output signal within the plurality of photodetectors.

8. The hybrid processor of claim 6 wherein the timing and control module is further responsive to the threshold signal and further receives an indicia of the transmission of a pulse, and estimates the target range as a function of the time delay between the transmission to the target detection.

9. The hybrid processor of claim 1 wherein the optical processor is further operative to estimate the Doppler shift of the target, and to estimate the range of the target.

10. The hybrid processor of claim 9 further including:
    a first sample module configured and arranged to sample the IF signal and provide a plurality of sampled IF signals;

an analog to digital converter coupled to the first sample module and configured and arranged to digitize the plurality of sampled IF signals into a plurality of digitized IF data;

a first in first out buffer coupled to the analog to digital converter and configured and arranged to store a predetermined amount of the digitized IF data and dumping excess data when overfilled;

a digital signal processor coupled to the optical processor and to the first in first out buffer;

the first in first out buffer responsive to the cue signal by not accepting new digitized IF data and providing the stored data to the digital signal processor;

the digital signal processor responsive to the cue signal, the estimate of the Doppler shift of the target, and the estimate of the range of the target by processing the stored data provided by the first in first out buffer to determine at least one target characteristic.

11. A method for instantaneous all-range cueing, said method comprising the steps of:

providing an intermediate frequency (IF) signal;

up-converting and bandlimiting the IF signal into a correlator drive signal having a correlator frequency;

applying the correlator drive signal to an acousto-optical Bragg cell;

applying a collimated laser beam to the acousto-optical Bragg cell;

detecting a plurality of diffracted light beams from the acousto-optical Bragg cell;

comparing the detected plurality of diffracted light beams with a predetermined threshold;

in the event that one of the detected plurality of diffracted light beams exceeds the predetermined threshold, providing a cue signal indicative of a detected target.

12. The method of claim 11 further including the step of estimating the Doppler shift of the detected target.

13. The method of claim 11 further including the step of estimating the range of the detected target.

14. The method of claim 11, further comprising the step of receiving the cue signal in a digital signal processor.

15. A method of cueing for signal processing, said method comprising the steps of:

receiving a detected intermediate frequency (IF) signal;

converting said IF signal to a first radio frequency (RF) signal and a second RF signal;

up-converting said first RF signal, thereby producing an up-converted signal;

causing said up-converted signal to propagate through an acousto-optic cell;

directing a probe laser signal through said acousto-optic cell;

detecting one or more diffracted output signals from said acousto-optic cell;

producing a cueing signal in response to said detecting one or more diffracted output signals;

determining one or more characteristics of an object from said second RF signal in response to said cueing signal.

16. The method of claim 15 further comprising the step of:

converting a wide bandwidth optical signal pulse to said IF signal in a heterodyne detector.

17. The method of claim 16 further comprising the step of producing said wide-bandwidth optical signal pulse from a mode-locked laser.

18. The method of claim 15 wherein said step of converting said IF signal is up-converting said IF signal.

19. The method of claim 18, said step of converting said IF signal further comprising the step of filtering said IF signal, thereby producing a filtered signal.

20. The method of claim 19 wherein said step of filtering is match-filtering.

21. The method of claim 19 further comprising the step of down-converting said filtered signal and thereby producing a baseband signal.

22. The method of claim 21 further comprising resolving said baseband signal into an in-phase components and an in-quadrature component.

23. A hybrid processor for detecting in an intermediate frequency (IF) signal a target illuminated by a laser, the hybrid processor comprising:

a correlator RF drive module including:
an optical receiver for receiving a reflected laser signal from said object and providing as an output an electrical signal;
a first mixer receiving said electrical signal and operative to mix said electrical signal with a first mixing signal to provide as an output a first mixed signal;
a matched filter receiving said first mixed signal and operative to filter said first mixed signal to provide a first filtered signal; and
a second mixer receiving said first filtered signal and operative to mix said first filtered signal with a second mixing signal to provide as an output an IF signal;

an optical spectrum analyzer/correlator including:
a laser source providing a laser beam;
an acousto-optical Bragg cell having a modulator input coupled to the correlator RF drive module and receiving the correlator drive signal therefrom;
collimating optics disposed between the laser source and the acousto optical Bragg cell the collimating optics configured and arranged to collimate the laser beam and to provide a collimated laser beam, the acousto-optical Bragg cell disposed to receive the collimated laser beam;
the acousto-optical Bragg cell responsive to the IF signal by diffracting the collimated laser beam, the acousto-optical Bragg cell providing a plurality of diffracted output light beams and an undiffracted output light beam;

an optical system configured and arranged to receive the plurality of diffracted light beams and to Fourier transform the plurality of diffracted light beams and further configured and arranged to image the plurality of the diffracted light beams onto an image plane;

an integrating optical detector array including a plurality of photodetectors, the optical photodetector array disposed within the image plane and providing a plurality of output signals each corresponding to the output of one of the plurality of photodetectors;

an optical processor coupled to the integrating optical detector array and receiving the plurality of output signals therefrom, the optical processor operative to process the plurality of output signals to detect a target.

24. The hybrid processor of claim 23 wherein the optical processor in processing the received plurality of output signals is operative to compare each of the plurality of output signals to a predetermined threshold, wherein a target is detected when one of the output signals exceeds the predetermined threshold.

25. The hybrid processor of claim 23 wherein the optical processor is further operative to correlate the plurality of output samples modulo the number of the plurality of photodetectors divided by the number of the plurality of diffracted light beams.

26. The hybrid processor of claim 1 wherein the optical processor is further operative to estimate the Doppler shift of the target as a function of the position of the photodetector corresponding to the detected output signal within the plurality of photodetectors.

27. The hybrid processor of claim 23 wherein the optical processor further receives an indicia of the transmission of a pulse, and estimates the target range as a function of the time delay between the transmission to the target detection.

28. The hybrid processor of claim 23 wherein the optical processor includes:
a timing and control module operative to provide a plurality of control signals;
an accumulator coupled to the the integrating optical detector array and receiving the plurality of output signals therefrom, the accumulator configured and arranged to accumulate the plurality of output signals over a predetermined period of time;
a optical processor memory coupled to the accumulator and configured and arranged to store the plurality of accumulated values wherein each of the plurality of accumulated values corresponds to a respective photodetector;
a threshold detector coupled to the optical processor memory, the threshold detector configured and arranged to compare each of the plurality of accumulated values to a predetermined threshold, wherein in the event that one of the plurality of accumulated values exceeds the predetermined threshold a threshold signal is provided to the timing and control module;
the timing and control module responsive to the threshold signal by providing a cue signal output.

29. The hybrid processor of claim 28 wherein the timing and control module is further responsive to threshold signal by estimating the Doppler shift of the detected target as a function of the position of the photodetector corresponding to the detected output signal within the plurality of photodetectors.

30. The hybrid processor of claim 28 wherein the timing and control module is further responsive to the threshold signal and further receives an indicia of the transmission of a pulse, and estimates the target range as a function of the time delay between the transmission to the target detection.

31. The hybrid processor of claim 23 wherein the optical processor provides a cue signal upon the detection of a target and the optical processor is further operative to estimate the Doppler shift of the target, and to estimate the range of the target.

32. The hybrid processor of claim 31 further including:
a first sample module configured and arranged to sample the IF signal and provide a plurality of sampled IF signals;
an analog to digital converter coupled to the first sample module and configured and arranged to digitize the plurality of sampled IF signals into a plurality of digitized IF data;
a first in first out buffer coupled to the analog to digital converter and configured and arranged to store a predetermined amount of the digitized IF data and dumping excess data when overfilled;
a digital signal processor coupled to the optical processor and to the first in first out buffer;
the first in first out buffer responsive to the cue signal by not accepting new digitized IF data and providing the stored data to the digital signal processor;
the digital signal processor responsive to the cue signal, the estimate of the Doppler shift of the target, and the estimate of the range of the target by processing the stored data provided by the first in first out buffer to determine at least one target characteristic.

33. The hybrid processor of claim 32 wherein the sample module includes:
an I/Q processor;
a power splitter coupled to the output of said second mixer and operative to split the IF signal into first and second output IF signals and operative to coupled said first IF signal to said optical spectrum analyzer/correlator and said second IF signal to said I/Q processor operative to provide a plurality of sampled in-phase signals and quadrature phase signals to said analog to digital converter.

34. The hybrid processor of claim 31 wherein the matched filter has a bandwidth that is a function the Doppler shift of the target.

* * * * *

UNITED STATES PATENT AND TRADEMARK OFFICE
CERTIFICATE OF CORRECTION

PATENT NO. : 6,603,536 B1
DATED : August 5, 2003
INVENTOR(S) : Victor Hasson et al.

It is certified that error appears in the above-identified patent and that said Letters Patent is hereby corrected as shown below:

Column 3,
Line 23, "cell to provides" should read -- cell provides --.

Signed and Sealed this

Twenty-eighth Day of September, 2004

JON W. DUDAS
*Director of the United States Patent and Trademark Office*